June 23, 1959   C. W. MICHATEK ET AL   2,892,073
SEMI-AUTOMATIC FLASH HOLDER
Filed Aug. 13, 1956   2 Sheets-Sheet 1

CHESTER W. MICHATEK
HAROLD L. MALONE
INVENTORS

BY Daniel I. Mayne

ATTORNEYS

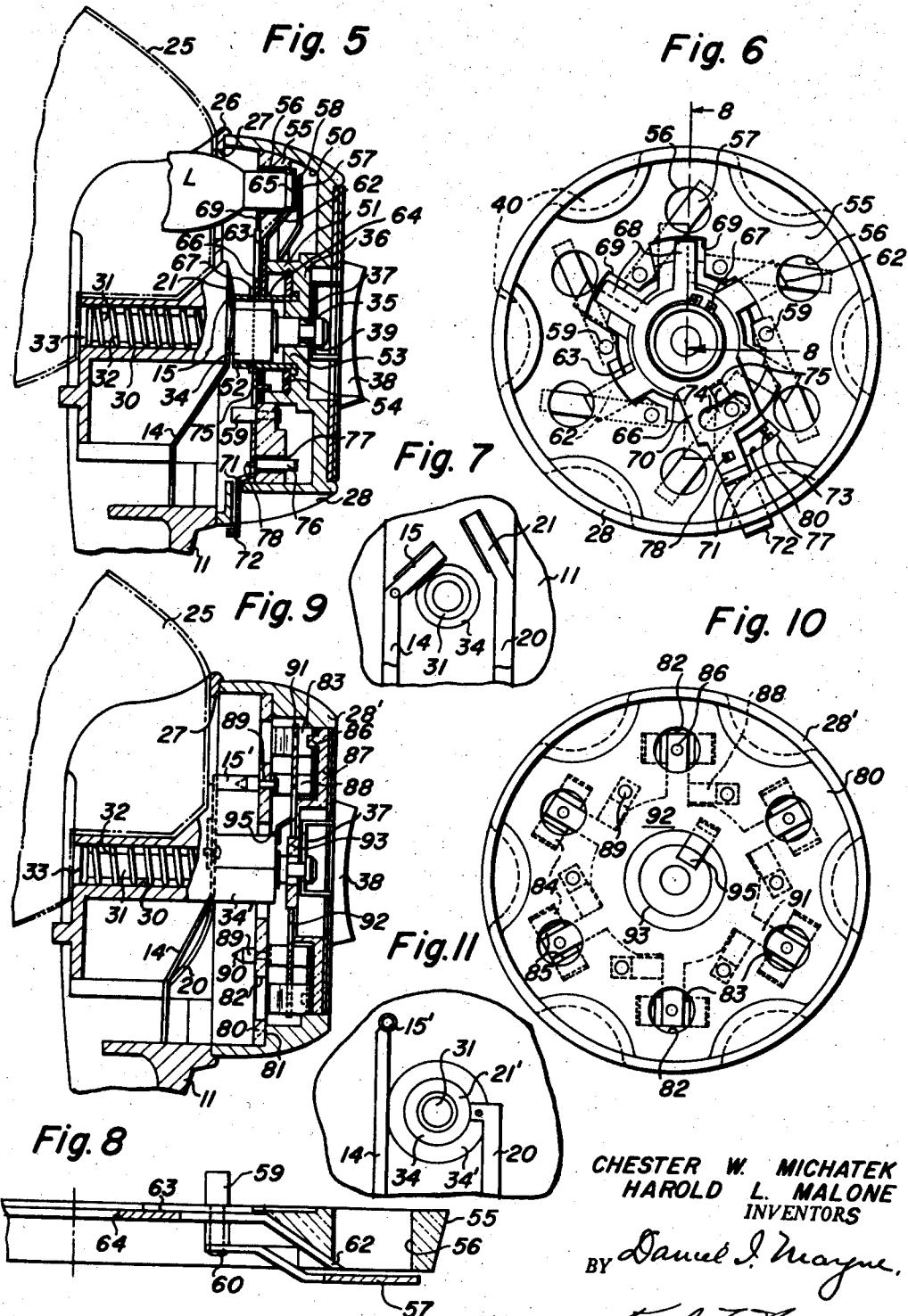

United States Patent Office 2,892,073
Patented June 23, 1959

2,892,073
SEMI-AUTOMATIC FLASH HOLDER

Chester W. Michatek and Harold L. Malone, Rochester, N.Y., assignors to Eastman Kodak Company, Rochester, N.Y., a corporation of New Jersey Application August 13, 1956, Serial No. 603,579

6 Claims. (Cl. 240—1.3)

The present invention relates to a flash holder adapted to be attached to and used in combination with a camera equipped with a built-in flash synchronizer for taking flash pictures, and particularly to such a flash holder having a flash lamp circuit which is completed only when the holder is attached to the camera on which it is adapted to be used and which is semi-automatic in nature so that a plurality of lamps can be positioned and fired in succession without the operator being required to handle the individual lamps per se.

One object is to provide a flash holder into which a plurality of flash lamps may be loaded prior to use and can be successively moved into and out of firing position by the operator without his having to touch the individual lamps.

And yet another object is to provide a multiple flash holder of the type described in which the lamps are mounted in a turret detachably connected on the back of the flash holder in such a way that the operator can change lamps by merely pulling the turret axially outward to remove a lamp through the back of the reflector and then rotating the turret to position a new lamp on the optical axis of the reflector after which the turret is allowed to move toward the reflector to insert the new lamp into the reflector through the back thereof.

And still another object is to provide a multiple flash holder of the type described in which a plurality of lamps are adapted to be carried by a single disk which can be snapped into and out of the turret for the purpose of loading and unloading a plurality of lamps at the same time.

And yet another object is to provide a multiple flash holder of the type described having lamp sockets arranged to positively retain the flash lamps in position after they are inserted thereinto by a straight thrust, the lamp retaining means for each socket being so designed and arranged that they can be simultaneously released through the actuation of a single release lever extended to the outside of the turret whereby all lamps will be ejected from their sockets at once to facilitate rapid reloading.

The novel features that we consider characteristic of our invention are set forth with particularity in the appended claims. The invention itself, however, both as to its organization and its methods of operation, together with additional objects and advantages thereof, will best be understood from the following description when read in connection with the accompanying drawings in which:

Fig. 1 is an exploded perspective view of a multiple flash holder constructed in accordance with a preferred embodiment of the present invention with parts of the wall of the housing broken away to show the flash lamp circuit therein and the manner of mounting the turret support spindle thereon, and showing the turret in the position it assumes just as it is about to be mounted on, or is being removed from, the housing;

Fig. 5 is a vertical sectional view taken through the flash holder with the turret mounted thereon, and showing one embodiment of flash lamp socket construction which may be used;

Fig. 6 is a front elevational view of the turrent construction shown in Fig. 5, the turrent being removed from the flash holder housing and having no lamps in the socket;

Fig. 7 is an elevational detail of the rear side of the flash holder of a form shown in Fig. 5, and showing the arrangement of electrical contacts which are adapted to cooperated with the electrical contacts of the turret construction shown in Figs. 5 and 6 to connect the lamp sockets into the flash lamp circuit in succession;

Fig. 8 is an enlarged sectional detail taken substantially on line 8—8 of Fig. 6; and Figs. 9, 10 and 11 correspond to Figs. 5, 6 and 7 except that they show another embodiment of flash lamp socket on the turret, or one which frictionally retains the lamps in position rather than positively retaining them, and showing the manner of connecting the lamp socket contacts into the flash lamp circuit in the housing as they are successively indexed into firing position.

Figure 1:
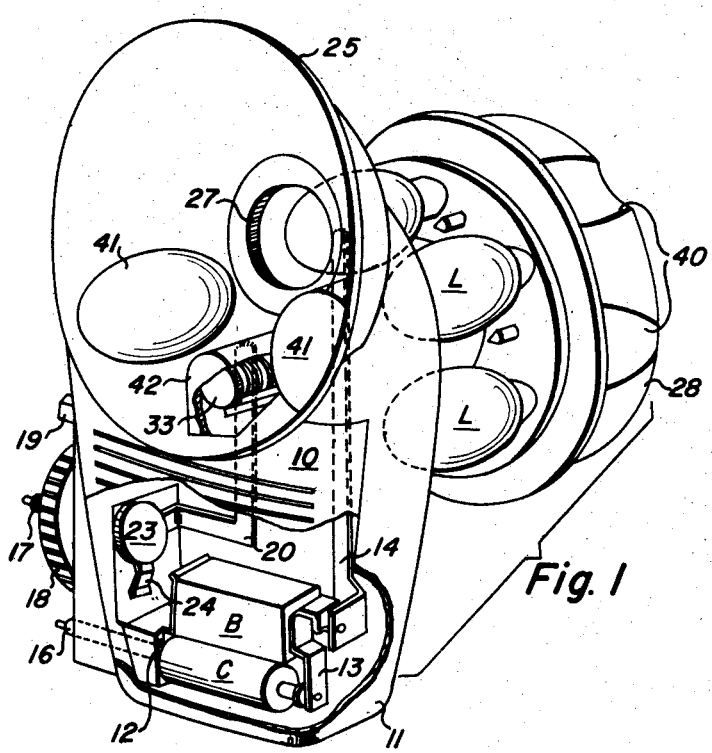
Figure 3:
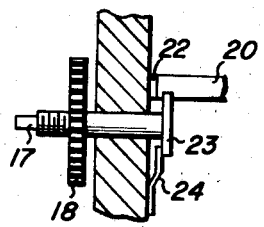
Fig. 3 is an enlarged sectional detail showing how a flash lamp circuit in the flash holder is normally broken when the holder is not on a camera and is automatically completed when the flash holder is attached to a camera.

Looking now at Fig. 1, a multiple flash holder constructed in accordance with the present invention comprises a housing 11, molded from a plastic material, the lower part of which is recessed to contain the power supply for a flash lamp circuit and which recess is adapted to be caused by a snap on cover 10. While the power supply may be two small batteries, it has been shown here as a BC power pack composed of battery B and a condenser C which are capable of being slipped into metal clips 12 and 13 fixed in the recess. One side of the power supply is connected to contact strap 14 which extends upwardly of the housing and terminates in a stationary contact 15 or 15′, see Figs. 7 and 11, adjacent the aperture in the rear side of the reflector to be engaged by a contact on the lamp sockets carried by the turret as will be fully described hereinafter. The other side of the power supply is connected to terminal 16 which extends to the outside of the flash holder. Also extending from the outside of the flash holder housing in spaced relation with terminal 16 is a threaded terminal 17 which is rotatably and slidably mounted in the wall of the housing and has associated therewith a knurled hand wheel 18 by means of which it can be rotated, see Fig. 3. As is customary, the flash holder is mounted on a camera wall by inserting terminals 16 and 17 thereon into cooperating female terminals on the camera wall which are in turn connected to opposite sides of the flash synchronizer switch associated with the camera shutter. The female terminal in the camera wall which is to cooperate with terminal 17 of the flash holder will, of course, be threaded so that when hand wheel 18 is rotated, the flash holder will be drawn down tight against the camera wall and be positively attached thereto. If desired, and as is customary, a positioning lug 19 may be provided on the flash holder housing in spaced relation with terminal 17 which is adapted to engage the camera wall and properly square the flash holder thereon when wheel 18 is turned to pull the holder down onto the camera body.

The other side of the flash lamp circuit in the flash holder comprises a metal strap 20 which extends from a contact 21 or 21' at the back of the reflector, as will be fully described hereinafter, and which is adapted to be connected to the other terminal of the lamp sockets in the turret. The other end 22 of metal strap 20 is turned over against the wall of the housing and into a position to be engaged by an enlarged head 23 on the inner end of terminal 17 when the flash holder is attached to the camera and thereby completing the connection of the flash lamp circuit of the flash holder to the synchronizer switch in the camera. A spring finger 24, see Fig. 3, normally engages the inner side of the enlarged head 23 and forces it away from the end 22 of contact strap 20 when the flash holder is disconnected from the camera. This breaks the flash lamp circuit of the flash holder so that when the flash holder is off the camera the lamp circuit cannot be accidentally shorted by laying the same on some metal object which would connect terminals 16 and 17. When the flash holder is attached to a camera and screw terminal 17 is screwed into its cooperating plug on the camera it will be moved axially so that the enlarged head 23 thereon will compress spring finger 24 and be brought into engagement with end 22 of contact strap 20 to complete the lamp circuit.

Fastened in a recessed portion in the top of said flash holder housing 11 is a reflector 25. The thin wall 26 of the housing and the rear wall of the reflector are provided with an opening 27 which is substantially on the optical axis of the reflector and is of sufficient diameter to allow a commercially available miniature flash lamp L to be passed into and out of said reflector from the rear of the flash holder. A plurality of these flash lamps L, in this case six, are mounted in sockets in spaced annular relation in a circular turret 28 which is adapted to be detachably connected to the back of the housing for loading and unloading of the lamps. The turret is so mounted on the housing that it can be moved to and from the housing in a direction parallel to the optical axis of the reflector to insert a lamp into the reflector and pull a burned lamp therefrom and to rotate a new lamp into position for insertion into firing position within the reflector.

To this end, the housing includes a bore 30 in which a spindle 31 is slidably and rotatably positioned on an axis substantially parallel to the optical axis of the reflector. This spindle 31 is normally retracted into the housing by a coiled spring 32 surrounding the same and acting on an enlarged end 33 on the spindle. The spindle is of such a length that in its retracted position it extends through a metal bearing 34 fixed to and extending beyond the back wall of the housing and through a bore 35 in an offset portion 36 of the rear wall of the turret when the turret is positioned on the flash holder. The turret is then fastened to the end of the spindle by a releasable latch 37 slidably mounted on the back of the turret to be moved by finger pressure on finger piece 38 between a release position, wherein an opening in said latch member large enough to pass the end of said spindle is aligned with the spindle, and a latched position, wherein a narrow portion of said opening engages the circumferential groove 39 near the end of the spindle. With the turret latched to the end of said spindle all the operator has to do to change lamps is grasp the finger recesses 40 provided on the periphery thereof, pull the turret rearwardly against the action of coil spring 32 until a lamp is pulled from the reflector, turn the turret 60 degrees to position the next lamp on the optical axis of the reflector, and then allow the spring to return the spindle and turret against the back of the housing.

In order to accommodate the two lamps next to the lamp in the reflector, the reflector is provided with a pair of depressions 41 into which the lamps in these positions extend. Likewise, to accommodate the spindle, or the bore in the housing in which the spindle is slidably mounted, the reflector has a depression 42, see Fig. 1. It is pointed out that those portions of the reflector forming the depressions 41 and 42 are coated with a reflector material like the remainder of the reflector, and while these portions of the reflector deviate from the general parabolic shape of the over-all reflector, they do not appear to affect the efficiency of the reflector in any noticeable or detrimental degree. In order to accommodate the lamps other than the one in the reflector the back of the housing is suitably recessed in a manner not shown.

The turret may be provided with different types of lamp socket constructions and means for connecting the lamp socket contacts in firing relation in the lamp circuit of the flash holder. In the drawings we have shown two different embodiments in this respect, one where the lamps are positively held in their sockets and are all released therefrom simultaneously, see Figs. 5-8, and the other where the lamps are held frictionally in the sockets and have to be pulled axially therefrom. The first mentioned embodiment, which we consider preferable, will be discussed first.

Referring now to Figs. 5-8, the turret 28 which is generally circular in shape is dished out to provide a cavity 50 in the bottom of which an upstanding annular ring 51 is formed during molding of the turret in concentric relation with the spindle bore 35. A metal conducting sleeve 52 is held in a telescopic relation with a circular wall 53 by a clincher ring 54 which rests on a flnage on said conducting sleeve and is swedged into the inner wall of the annular ring 51. This conducting sleeve 52 telescopes with the bearing portion 34 extending from the rear of the housing and engages contact 15 on the back of the housing to connect a corresponding one of each of the lamp socket contacts into the flash lamp circuit when the turret is moved to a lamp inserting position through the action of the spring acting on the spindle, as will be fully described. Fixed in the cavity of the turret in spaced relation with the top and bottom thereof is a transverse partition 55 preferably made of an insulating material. This partition is provided with six annularly arranged holes 56 spaced 60 degrees apart and which constitute sockets into which the base of a flash lamp is adapted to be inserted, as shown in Fig. 5. Extending across the bottom of each hole of socket 56 is a spring finger contact 57 which is adapted to engage the base contact 58 of a flash lamp. As most clearly shown in Fig. 8, each of these spring contact fingers 57 is individually fastened to the underside of the partition 55 to one side of its respective socket by having the end of a contact pin 59 extending through and from the top of the partition peened over as shown at 60 in Fig. 8. Each of these contact pins 59 is adapted to successively engage the contact 21 on the end of contact strip 20 when, and only when, the socket with which it is associated is on the optical axis of the reflector and the turret is against the housing to insert a lamp in that socket into the reflector. This connects that socket, and only that socket, into the flash lamp circuit of the housing. The other contact of each of the lamp sockets is formed by one of six resilient contacts 62 extending radially from, and forming the arms of, a metal spider 63. The spider 63 has a hole 64 in its center which slips snugly over the conducting sleeve 52 with a fit sufficiently tight to produce an electrical contact between these two parts but still allow the spider to oscillate on the sleeve between a lamp latching position shown in Fig. 6, wherein one corner of each of the contacts 62 extends slightly into its socket to positively engage a circumferential groove and/or flange 65 on the lamp base, see Fig. 5, and a lamp releasing position, wherein they move out of said socket to release the lamp bases.

So that all of the six contacts 62 can be simultaneously moved to a lamp releasing position a second spider 66, on the form best shown in Fig. 6, is oscillatably mounted on the conducting sleeve 52 in parallel spaced relation with the spider 63 and held in axial position on said sleeve by a pinch ring 67. The spider 66 rests on top of the partition 55 and has two spaced radial arms 68 which rest in recesses 69 in the top of the partition to support the spider in a given plane parallel to the top of the partition. Also extending radially from the spider 66 is a relatively wide supporting arm 70 from which a lever 71 extends through a slot in the turret wall and to the outside of the turret to terminate in a turned down, knurled actuating finger 72. The arm 70 and lever 71 extending therefrom rest in a recess 73 in the top of the partition 55 which is substantially as deep as the thickness of these parts and is wide enough to allow sufficient oscillatory movement of spider 66 relative to the turret to move the spider 63 and the six contacts 62 thereon to their lamp releasing position. The arm 70 has an elongated opening 74 which straddles one of the contact pins 59 to allow the same to oscillate relative to the pin without contacting it and shorting the flash lamp circuit. A turned down projection 75 on the arm 70 engages a hole in spider 63, see Fig. 5, so that the spider 63 and the six socket contacts 62 thereon can be oscillated by manual movement of lever 71. A U-shaped spring 76 is located in an aperture 77 in the partition and has one end 78 extending through a hole in the lever 71 and the other end 80 anchored to the partition. This spring 76 normally moves the spider 66, and hence spider 63 and the six contacts 62 thereon, clockwise, looking at Fig. 6, to a lamp latching position. To release all of the six lamps from their sockets simultaneously it is merely necessary to move actuating finger 72 counterclockwise against the action of spring 76.

Having thus described the construction of a preferred embodiment of our multiple flash holder, we will explain the overall operation thereof. Let us assume that all of the lamps in the turret have been fired and it is desired to reload the same with new lamps. The first step is to remove the turret from the housing and this is done by sliding the latch button 38 on the rear of the turret to a release position in which the large opening of the latch member 37 is aligned with the end of the spindle 31. Then the turret is slipped axially off the end of the spindle and the lever 71 is moved counterclockwise through actuating finger 72 to release all of the lamps from their sockets. This movement of lever 71 causes the spiders 63 and 66 to oscillate to position where each of the six socket contacts 62 are moved from positive engagement with the flange 65 on the periphery of the lamp base, and contact springs 57 which engage the base contacts of the lamps eject the lamps from the turret by reason of their having been placed under tension by insertion of the lamps into their sockets. The finger piece 72 is then released whereupon the spring 76 returns it and the six contacts 62 into lamp engaging relation with their respective sockets. A new lamp is now inserted into each socket by a straight axial thrust whereupon the contacts 62 snap over and positively engage a circumferential groove and/or flange 65 on the periphery of the lamp base. Now the turret is slipped back onto the end of the spindle 31 and latched thereto by sliding latch button 38 to its latched position. When the turret is held against the housing by the coil spring 32 acting on the spindle 31 the socket for the lamp which is in the reflector is connected into the lamp circuit in the housing by virtue of the engagement of the end of the conducting sleeve 52 with contact 15 of the housing and the engagement of the contact pin 59 associated with that particular socket with the contact 21 on the back of the housing. When the lamp in the reflector has been fired and a new one is to be inserted in the reflector in its place, it is only necessary to grasp the turret and pull it straight out against spring 32 until the burned lamp is removed from the reflector, then index the turret 60 degrees and allow spring 32 to pull the turret back against the housing. When the turret returns to this position, the new lamp socket is the only one connected into the flash lamp circuit in the housing because only its pin contact 59 is engaging contact 21 on the back of the housing.

In Figs. 2, 9, 10 and 11 there is shown another embodiment of lamp turret having sockets which frictionally engage the lamp bases rather than positively engaging them. This embodiment differs from that already described primarily in the arrangement and form of the lamp socket contacts and the manner in which these contacts are connected into the flash lamp circuit in the flash holder housing. Accordingly, parts in this embodiment corresponding to those of the one already described will be designated by the same reference character. The housing and all parts associated therewith are exactly the same as in the first embodiment with the exception of the electrical contacts on the back thereof which are connected into opposite sides of the flash lamp circuit in the housing. In this embodiment the contact strap 14 is connected to a contact pin 15' spaced radially from the spindle 31 and having a conical depression in the end thereof, see Figs. 9 and 11. The other contact 21' connected to contact strap 20 is formed by the metal bearing 34 for the spindle which in this case is directly connected to the contact strap 20 by metal plate 34'.

In this embodiment the lamp turret 28' is of the same general shape as the turret previously described and is adapted to be detachably latched to the end of the spring retracted spindle 31 in the same way the sliding latch 37 actuated by button 38 on the back of the turret. The dished out interior of the turret is divided into two compartments by a partition 80 made of insulating material which is fixed in any suitable manner to a shoulder 81 formed around the inside wall of the turret. This partition 80 is provided with six holes 82 spaced 60 degrees apart around the longitudinal axis thereof and which holes constitute lamp sockets into which the lamp bases are inserted.

Figure 2:
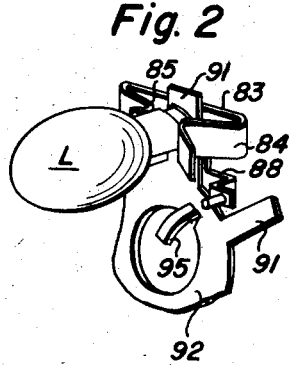
Fig. 2 is an enlarged perspective detail showing the form of the lamp socket contact arrangement constructed in accordance with one embodiment of the invention.

Below each hole of sockets 82 there is socket contact 83 of the form best shown in Fig. 2 which is adapted to frictionally engage the shell of the lamp base. As shown, this socket contact is generally U-shaped with the upright arms 84 doubled inwardly toward the periphery of the hole 82 to form rounded portions 85 which are adapted to snap over and engage behind the flange or circumferential groove in the shield of the lamp based when the lamp is inserted into the socket by the straight thrust. As clearly shown in Fig. 9, each of these socket contacts 83 is mounted in the turret by having a hole in the cross arm thereof engaging an upstanding lug 86 on the back plate 87 of the turret which is made of insulating material. These contacts are fixed in position by having an offset arm 88 integral therewith pinned to the underside of the partition 80 by peening over the end of a contact pin 89. These six contact pins 89 are spaced radially from their respective sockets and have conical ends 90 which are adapted to be moved into engagement with the conical recess in the end of contact 15' on the housing to connect these U-shaped socket contacts into one side of the lamp circuit of the housing as their respective sockets are moved onto the optical axis of the reflector and the turret is retracted to move the lamp therein into firing position within the reflector.

The other contact of each lamp socket which is adapted to engage the base contact of the lamps and connect them into the other side of the lamp circuit comprises six spring arms 91 extending radially from a spider 92 having an aperture in its center which slips over a hub portion 93 on the back wall 87 of the turret. As clearly shown in Fig. 9, each of these spring arms 91 extends across one of the sockets 82 and between the upstanding arms 84 of socket contacts 83 to engage the lamp contact located in the center of the base of the lamp. Each of these last-mentioned socket contacts is adapted to be connected into the lamp circuit through a turned down spring arm 95 formed out of the spider 92 and which is adapted to engage the metal bearing 34 on the housing when the turret is moved against the same by the coil spring 32 acting on spindle 31.

Figure 4:
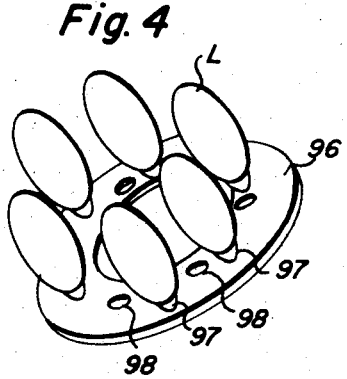
Fig. 4 is a perspective view showing how a plurality of lamps may be mounted on a common carrying disk so that they can be simultaneously loaded into or removed from the turret of the flash holder.

With lamp sockets having contacts which are designed to frictionally hold the lamps in place in the socket, as just described, it is necessary to pull the lamps from the socket. This process, as well as the loading process, may be facilitated by mounting the six lamps initially in a thin disk 96 of some suitable insulating material, said disk having an outside configuration and a thickness which permits the disk to be inserted into the open end of the turret when it is removed from the housing, see Fig. 4. As shown, this disk 96, which may be made of cardboard, plastic, etc. has six holes 97 spaced 60 degrees apart in correspondence with the spacing of the sockets 32 in the turret and through which the lamp bases are inserted to be frictionally retained in an upright position. Six holes 98 are also provided in the disk to allow the six contact pins 89 in the turret to pass through the disk when it is mounted in the turret. With the lamps mounted on a disk in this way, the entire six lamps can be simultaneously mounted in the turret or removed therefrom by placing the disk in the open end of the turret or removing it therefrom. While this type of disk can be used merely as a lamp loading and unloading fixture for this type of flash holder, it would also provide a convenient way of packaging flash lamps for use in a flash holder of this type. Such a loading fixture would also be useful in connection with a flash holder having lamp sockets which are designed to positively latch the lamps in position because it would permit the simultaneous loading of the lamps into their sockets and would hold them all together as they are ejected from their sockets upon manual release.

While we have shown and described certain specific embodiments of our invention, we are fully aware that many modifications thereof are possible. Our invention, therefore, is not to be limited to the precise structural details shown and described, but is intended to cover all modifications coming within the scope of the appended claims.

Having now particularly described our invention what we claim is:

1. A portable flash holder comprising a housing, a flash lamp circuit in said housing including means for supporting a source of potential; a concave reflector mounted on the front of said housing and provided with an aperture substantially on its optical axis which is sufficiently large in diameter to permit a flash lamp to be passed axially therethrough; a lamp turret separate from said housing; a plurality of lamp sockets mounted in spaced annular relation on said turret with their axes parallel to one another; means for detachably connecting said turret to the rear wall of said housing for both axial and rotative movement relative to said reflector and housing on an axis spaced from and substantially parallel to the axis of the aperture in said reflector, whereby said axial movement permits insertion into and withdrawal from said reflector of a lamp in one of said sockets and said rotative movement permits moving successive lamps in the sockets into alignment with the aperture in said reflector when the turret is moved axially away from the housing to withdraw a lamp from said reflector; a pair of spaced electrical contacts on said housing electrically connected into the flash lamp circuit in said housing; and contact means carried by said turret and electrically connected to said sockets adapted to engage said pair of contacts on the housing when the turret is moved toward the housing to insert a lamp in said reflector to connect the sockets into said flash lamp circuit, said contact means including a plurality of contacts equal in number to the number of sockets and each contact individually electrically connected to a different one of said sockets whereby only the socket in alignment with the aperture in the reflector is connected into the lamp circuit when the turret is moved toward the housing.

2. A portable flash holder comprising a housing, a flash lamp circuit in said housing including means for supporting a source of potential; a concave reflector mounted on the front of said housing and provided with an aperture substantially on its optical axis which is sufficiently large in diameter to permit a flash lamp to be passed axially therethrough into the reflector from the back thereof; a turret supporting spindle rotatably and slidably mounted in said housing in spaced parallel relation to the optical axis of said reflector and extending rearwardly from said housing; spring means normally urging said spindle axially into said housing to a retracted position and allowing the spindle to be pulled axially away from said housing to an extended position; a lamp turret; a plurality of lamp sockets mounted in spaced annular relation on said turret with their axes parallel to one another; a releasable latch on said turret for detachably connecting said turret onto the end of said spindle with the axis of said sockets parallel to said spindle, whereby by grasping and pulling outwardly on said turret said spindle can be moved to its extended position wherein a lamp in one of said sockets will be pulled out of said reflector after which the turret can be rotated to move another lamp into alignment with the aperure in said reflector and will be inserted into the reflector by the spring acting on said spindle upon release of the turret; and cooperating electrical contact means on said housing and said turret for automatically connecting only the socket on the optical axis of said reflector into said flash lamp circuit when the spindle is moved to its retracted position within the housing.

3. A portable flash holder according to claim 2 characterized by the fact that said cooperating electrical contact means on said housing and turret comprises a pair of spaced contacts on the rear side of said housing connected into the flash lamp circuit of said housing; a common contact on said turret electrically connected to all corresponding terminals of each of said sockets; a plurality of contact pins on said turret corresponding in number to the number of sockets, each one of said contact pins electrically connected to the other terminal of a different one of said sockets, said contact pins and said common contact so arranged relative to the pair of contacts on said housing that when the turret is moved toward the housing to load a lamp into said reflector the contact pin associated with said lamp socket and its common contact engage the pair of spaced contacts on the housing to connect only that lamp socket in firing position into the flash lamp circuit in the housing.

4. A portable flash holder according to claim 1 characterized by the fact that the several flash lamps are mounted on a common supporting disk by having their bases extending through and frictionally engaged by apertures in said disk which are spaced in correspondence with the spacing of the sockets in said turret whereby all lamps can be simultaneously inserted into and removed from said sockets by placing said disk on and removing it from said turret.

5. A portable flash holder according to claim 1 characterized by the fact that each of said sockets has one latching terminal movable to and from a normally operative position in which it is adapted to positively engage a circumferential flange on the base of the lamp when it is inserted into the socket, and means accessible from the outside of said turret for simultaneously moving all of said latching terminals from said operative lamp-engaging position so that all lamps will be released from their sockets at the same time.

6. A portable flash holder according to claim 5 characterized by the fact that each of said latching terminals comprises a spring finger extending radially from a spider mounted in said turret to oscillate about an axis parallel to the axes of said sockets between a lamp-latching position, wherein each of said fingers extends radially into a different one of said sockets to positively engage a circumferential flange on the base of the lamp when it is inserted into the socket, and a lamp releasing position, wherein each of said fingers is moved out of engagement with the lamp base; a spring normally acting on said spider to move it to said lamp-latching position; and an arm extending radially from said spider and to the outside of said turret for manually oscillating said spider to its lamp releasing position.

References Cited in the file of this patent

UNITED STATES PATENTS

| | | |
|---|---|---|
| 2,032,515 | Troup | Mar. 3, 1936 |
| 2,244,114 | Noir | June 3, 1941 |
| 2,408,469 | Malloy | Oct. 1, 1946 |
| 2,622,188 | Seeger et al. | Dec. 16, 1952 |
| 2,662,968 | Saraber | Dec. 15, 1953 |
| 2,708,395 | Wagner et al. | May 17, 1955 |
| 2,740,339 | Carter | Apr. 3, 1956 |
| 2,833,876 | Westra | May 6, 1958 |